United States Patent [19]

Schiek

[11] Patent Number: 4,681,638
[45] Date of Patent: Jul. 21, 1987

[54] IRON BLUE PIGMENTS AND PROCESS FOR PREPARATION

[75] Inventor: Robert C. Schiek, Glens Falls, N.Y.

[73] Assignee: Ciba-Geigy Corporation, Ardsley, N.Y.

[21] Appl. No.: 861,645

[22] Filed: May 2, 1986

Related U.S. Application Data

[63] Continuation of Ser. No. 681,044, Dec. 13, 1984, abandoned.

[51] Int. Cl.$^4$ .................................................. C09C 3/06
[52] U.S. Cl. .................................... 106/309; 106/304; 423/143
[58] Field of Search ................. 106/304, 309; 423/143

[56] References Cited

U.S. PATENT DOCUMENTS 3,915,733  10/1975  Reinhardt et al. .................. 106/304

Primary Examiner—Amelia B. Yarbrough
Attorney, Agent, or Firm—Harry Falber

[57] ABSTRACT

Improved iron blue pigments and a process for the production thereof whereby the basic ferrous sulfate-ammonium or potassium sulfate-alkali metal ferrocyanide reaction is modified by the addition of zinc ions so as to alter the chemical composition and improve the performance characteristics of the resulting iron blue pigment.

11 Claims, No Drawings

IRON BLUE PIGMENTS AND PROCESS FOR PREPARATION

This application is a continuation, of application Ser. No 681,044, filed Dec. 13, 1984, now abandoned.

Iron blue pigments are also known as ferriferrocyanide pigments and these terms encompass a variety of pigments with varying chemical formulae. The Pigment Handbook, Temple C. Patton, editor (John Wiley and Sons, N.Y., 1973) discusses iron blue pigments on pages 401–407.

Iron blue pigments are also known as Milori blue, Berlin blue, Paris blue, Prussian blue, mineral blue, steel blue, ferrocyanic blue and bronze blue. Largest use for iron blue pigments is by the printing ink industry especially in gravure type ink systems. Approximately 15 to 20% of iron blue is used by the coatings industry or for non-printing applications. Characteristic properties of iron blue pigments which are valued are: high color intensity, good dispersibility, good rheological behavior, good pure color shade, and resistance to alkali and reducing compounds.

Iron blue pigment is an alkaline ferriferrocyanide having the general formula $$Me(I)Fe(III)[Fe(II)(CN)_6] \cdot xH_2O$$

in which Me(I) is a monovalent alkali metal or ammonium ion. The pigment is produced by precipitation from hexacyanoferrate(II) solutions and iron(II) salt solutions via the intermediate stage of so-called white paste or Berlin White having the general formula $$Me(I)_2Fe(II)[Fe(II)(CN)_6] \cdot xH_2O$$

The Berlin White is digested in sulfuric acid and then appropriately oxidized.

The prior art discloses a number of variations of the basic process for preparing iron blue pigments in an attempt to obtain improved performance characteristics and better economy. U.S. Pat. No. 4,368,075 and U.S. Pat. No. 4,378,995 disclose a process whereby the proportion of potassium ferrocyanide is reduced in favor of the sodium salt and the reaction is conducted in two phases, respectively, with the potassium and sodium salts. The main feature of this process is cost reduction without sacrificing performance characteristics. U S. Pat. No. 4,309,480 modifies the basic procedure by adding an aluminum-containing reactant so as to form aluminum hydroxide in addition to iron blue and alledgedly improve the brightness and cleanness of the pigmented color. U.S. Pat. No. 4,113,508 modifies the process by conducting a flushing step in the presence of an amine flushing agent and by the addition of a polyoxyethylene-type surfactant. A further variation which is representative of the large number of modifications based on surfactant addition is disclosed in Japanese No. 51-82317 where an anionic-cationic surfactant blend is added to the system to provide an easily dispersible granular Prussian blue composition.

The primary object of this invention is, therefore, to provide an iron blue pigment composition with improved performance characteristics.

A further object is to provide a process for preparing such improved pigment compositions, which process is a modification of the conventional preparative process.

Various other objects and advantages of this invention will become apparent from the following detailed description thereof.

A modification of the conventional iron blue preparative process has now been discovered which surprisingly improves the performance characteristics of the resulting pigment in a number of significant areas. Iron blues are conventionally prepared by the reaction of ferrous sulfate, ammonium sulfate and sodium ferrocyanide, with potassium and sodium salts being optionally present. The instant modification involves adding a source of zinc ions to the reaction mix with the result that the produced iron blue pigment exhibits enhanced performance characteristics such as increased alkali resistance, (greener hue, cleaner masstone and greater strength). The zinc also allows for the manufacture of pigments which can be readily treated with organics or surfactants to provide further improved performance in printing ink formulations and coatings.

Iron blue pigments are generally prepared by reacting together an iron(II) salt, an ammonium salt and an alkali metal ferrocyanide. Widely used are ferrous sulfate, ammonium sulfate and sodium ferrocyanide respectively. However, other raw materials or combinations of raw materials can be utilized. Thus, iron(II) chloride can be used in place of iron(II) sulfate. Potassium ferrocyanide can be used in place of the sodium salt. Potassium sulfate can replace all or part of the ammonium sulfate. Since these compounds are usually solids at room temperature they are dissolved in a solvent, normally water. The mole ratios of the ferrous salt to the alkali metal ferrocyanide is preferably 1:1.

Berlin White can be precipitated by the simultaneous or successive addition under constant agitation, of the raw materials, ferrous sulfate, ammonium sulfate and sodium ferrocyanide.

Concentrations of the iron(II) sulfate solution may be 50 to 300 grams per liter $FeSO_4 \cdot 7H_2O$. Sulfuric acid may be added to assist in dissolving the ferrous sulfate and also to prevent undue preoxidation of the ferrous sulfate in a heated solution prior to precipitation. Concentrations of the sodium ferrocyanide solution may be from 50 to 150 grams per liter, $Na_4Fe(CN)_6 \cdot 10H_2O$. Ammonium sulfate/sodium ferrocyanide mole ratios may vary from 0.5:1 to 1:2.5.

The coupling of the ferrous sulfate, ammonium sulfate and sodium ferrocyanide may take place under a variety of temperatures. Precipitation temperature to form the intermediate, Berlin White, can range from 15° C. to 100° C. Precipitations at high temperatures shorten process time by having the Berlin White at a predetermined digestion temperature. If lower precipitation temperatures are used, for example 30° C., then the Berlin White slurry needs to be heated to a predetermined digestion temperature such as 90° C.

The rate of coupling the ferrous sulfate, ammonium sulfate and the sodium ferrocyanide can be as short as 15 minutes and as long as 60 minutes. Shorter coupling times are preferred, 15 to 30 minutes.

Complete precipitation of the Berlin White is carried out in such a way as to have a neutral endpoint, no excess ferrous ion or excess ferrocyanide ion or to have an excess of ferrous ion that may vary up to 1.5 grams Fe per liter.

The digestion step can take place in the presence of HCl or $H_2SO_4$ and this is followed by oxidation of the Berlin White with known oxidizing agents such as sodium chlorate, potassium chlorate, hydrogen peroxide, potassium or sodium bichromate.

With complete oxidation and complete color development the iron blue pigment is filtered to remove the soluble salts and the filter cake is washed to remove acidity. The presscake can be handled now in a number of ways. Dried out it may be ground finely into a powder. The presscake may be flushed directly in an ink vehicle. Thirdly, the presscake can be processed further by treatment with organics or surfactants to improve dispersion and vehicle compatibility properties.

The new process incorporates zinc ions into the chemical makeup of the iron blue pigment. Typical sources of the zinc ion include zinc sulfate, zinc chloride, zinc nitrate or other soluble zinc salts which are compatible with the ferrous sulfate or ferrous sulfate, ammonium sulfate solution. The zinc ion may be also added after the Berlin White is formed, but the preferred method is with addition of the ferrous sulfate. The desired concentration of the zinc ions is 0.3 to 1.2% by weight of $FeSO_4 \cdot 7H_2O$ with the range 0.3 to 0.9% being preferred.

The remaining steps or procedures in the processing from the Berlin White intermediate to the final oxidized blue pigment is accomplished by known methods.

Incorporation of the zinc into the chemical makeup of the iron blue pigment produces a better performing pigment exhibiting a greener shade, stronger tinting properties and added resistance to alkali attack. It is believed that the zinc ion is precipitated first as a simple metal ferrocyanide, however, mixed salts or double ferrocyanides of zinc are possible.

The zinc containing iron blue pigment may be treated further as a presscake. Flushing to improve dispersion properties in printing inks may be accomplished as is taught in U.S. Pat. No. 4,113,508. Treatment with anionic, nonionic or cationic surfactants can also be performed on the zinc containing iron blue resulting in blue pigments which exhibit particularly good color shade, good coloring power, very good dispersion characteristics and which yield highly brilliant gravure printing inks and especially the blue pigmented toluene roto-gravure type printing inks.

The following examples further illustrate the embodiments of this invention.

EXAMPLE 1

Preparation of a Conventional Iron Blue

An aqueous solution of 271 grams of sodium ferrocyanide was prepared and brought to a volume of 4300 ml at 90° C. The pH of this solution was adjusted to 8.5 with sulfuric acid. 81.5 grams of ammonium sulfate and 181 grams of ferrous sulfate were then dissolved in water and brought to a volume of 1800 ml at 90° C. These two solution were mixed, one being added to the other evenly over a period of 15 minutes. The Berlin White precipitate which was formed was aged for an appropriate predetermined length of time (90 minutes), 60 grams of sulfuric acid added thereto, followed by the addition of 13.3 grams of sodium chlorate. The slurry was stirred for 30 minutes to allow the oxidation to completely change the Berlin White to iron blue.

EXAMPLE 2

Preparation of $Zn^{++}$-Containing Iron Blue of the Invention

An aqueous solution of 271 grams of sodium ferrocyanide was prepared and brought to a volume of 4300 ml at 90° C. The pH of the sodium ferrocyanide solution was adjusted to 8.5 with sulfuric acid. 81.5 grams of ammonium sulfate, 181 grams of ferrous sulfate and 5.0 grams of zinc sulfate were dissolved in water and brought to a volume of 1800 ml at 90° C. The ammonium sulfate, ferrous sulfate and zinc sulfate solution was added evenly over 15 minutes to the sodium ferrocyanide solution. The white precipitate formed was then aged (90 mintues). The pH of the slurry was approximately 3.5. At the end of the aging period, 60 grams of sulfuric acid were added, followed by 13.3 grams of sodium chlorate. To complete the oxidation of the Berlin White, the slurry was stirred for 30 minutes.

A visual comparison of the iron blue from Example 2 with that of the iron blue from Example 1 showed Example 2 to reflect a cleaner masstone, greener tint and stronger pigment.

Each of the pigments was also subjected to an alkali resistance test. The iron blue pigment is roller mill ground with litho varnish and the masstone ink paste is drawn down on paper. Paste inks made from pigments in Examples 1 and 2 are drawn down in juxtaposition on paper and the inks are thoroughly dried. A one inch section of the paper drawout is cut horizontally from the bottom and this is immersed in a 5% aqueous solution of sodium carbonate for 30 minutes. The exposed paper is removed and rinsed with distilled water.

The interaction of alkali with iron blue pigment converts the pigment to the brown ferric hydrate. Comparison of the juxtaposition inks shows that the iron blue with zinc incorporated into the formulation retains the blue coloration to a greater degree than the non-zinc formulated iron blue.

Alkali tests can also be done versus time showing the zinc treated iron blue remains blue longer compared to a non-zinc treated iron blue.

EXAMPLE 3

The procedure of Example 2 was generally repeated (minor pH variations) utilizing the following zinc sulfate concentrations:

A—0 grams
B—2.5 grams
C—5.0 grams
D—7.5 grams
E—10.0 grams

Pigments B-E were then compared to pigment A in various pigmentary properties, the results being noted in the following table.

| Pigment | Masstone | Tint | Strength | Black Stripe Paper Drawout |
| --- | --- | --- | --- | --- |
| B vs. A | sl. deeper | cleaner, sl. less red | sl. stronger | intense, deeper bronze |
| C vs. A | sl. deeper | cleaner, little less red | similar | intense, deeper bronze |
| D vs. A | deeper | cleaner, less red | sl. stronger | more intense, bronze |
| E vs. A | deeper | cleaner | sl. weaker | more intense |

The improved pigmentary characteristics of the instant system are evidenced by these observations.

EXAMPLE 4

An aqueous solution containing 81.5 grams of ammonium sulfate, 181 grams of ferrous sulfate and 5.0 grams of zinc sulfate were dissolved in water and brought to a volume of 4300 ml at 90° C. The pH of the solution was adjusted with sulfuric acid to 1.8. 271 grams of sodium ferrocyanide was dissolved in 1800 ml of water at 90° C. The sodium ferro-cyanide solution was added at a rate of 60 ml per minute to the ammonium sulfate, ferrous sulfate and zinc sulfate solution under constant stirring to form the Berlin White intermediate. Sixty grams of sulfuric acid was added to the slurry and the intermediate digested for 60 minutes. The Berlin White was then oxidized with 13.3 grams of sodium chlorate.

Filtering, washing, drying was accomplished on a portion of the iron blue pigment, while the remainder was treated as a presscake with a cationic surfactant such as a tertiary amine.

EXAMPLE 5

Same as Example 1 except 7.5 grams of zinc sulfate added to the Berlin White intermediate following the coupling of the ferrous sulfate, ammonium sulfate and sodium ferro-cyanide.

EXAMPLE 6

Same as Example 2 except 5.0 grams of potassium sulfate put up with the zinc sulfate, ferrous sulfate and ammonium sulfate and added to the sodium ferrocyanide.

EXAMPLE 7

Same as Example 2 except 5.0 grams of potassium sulfate added to the sodium ferrocyanide solution.

Summarizing, it is seen that this invention provides a modified iron blue pigment with improved pigmentary properties. Variations may be made in proportions, procedures and materials without departing from the scope of the invention as defined by the following claims.

What is claimed is:

1. In the process for the production of iron blue pigment comprising the reaction of ferrous sulfate, alkali metal or ammonium sulfate and alkali metal ferrocyanide to produce a white paste, the subsequent heating and oxidation of said white paste and the isolation of the iron blue pigment, the improvement comprising adding from about 0.3–1.2%, based on weight of ferrous sulfate, of a source of zinc ions to the reaction mix prior to the oxidation step.

2. The process of claim 1, wherein the zinc ions are added to the ferrous sulfate or ferrocyanide solution prior to the white paste production.

3. The process of claim 1, wherein the zinc ions are added to the white paste intermediate.

4. The process of claim 1, wherein potassium is also present and is added as $K_2SO_4$.

5. The process of claim 1, wherein said source of zinc ions is a soluble zinc salt compatible with the iron blue precipitation system.

6. The process of claim 5, wherein said source of zinc ions is selected from the group consisting of zinc sulfate, zinc chloride and zinc nitrate.

7. The process of claim 6, wherein said zinc source is zinc sulfate.

8. The process of claim 1, wherein said zinc ion concentration is from about 0.3 to 0.9%, based on weight of ferrous sulfate.

9. The process of claim 1, wherein sodium ferrocyanide, ammonium sulfate and ferrous sulfate are reacted to produce the white paste and sodium chlorate is the oxidizing agent.

10. The process of claim 1, where the iron blue pigment is further treated with cationic, nonionic or anionic surfactant.

11. Iron blue pigment of the formula $$Me(I)Fe(III)[Fe(II)(CN)_6]\cdot xH_2O$$

wherein Me(I) is a monovalent alkali metal ion or an ammonium ion, containing additionally about 0.3 to 1.2%, by weight, of zinc ions.